US012641301B2

(12) United States Patent
Rathi et al.

(10) Patent No.: US 12,641,301 B2
(45) Date of Patent: May 26, 2026

(54) CONTEXT-AWARE ERROR CONCEALMENT TO IMPROVE INFERENCE ACCURACY

(71) Applicant: NVIDIA Corporation, Santa Clara, CA (US)

(72) Inventors: Swapnil Jagdish Rathi, Pune (IN); Bhushan Rupde, Pune (IN); Kaustubh Purandare, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/812,305

(22) Filed: Aug. 22, 2024

(65) Prior Publication Data

US 2026/0059148 A1 Feb. 26, 2026

(51) Int. Cl.
| | |
|---|---|
| *H04N 19/895* | (2014.01) |
| *G06V 10/25* | (2022.01) |
| *G06V 20/40* | (2022.01) |
| *H04N 19/136* | (2014.01) |
| *H04N 19/167* | (2014.01) |
| *H04N 19/172* | (2014.01) |
| *H04N 19/184* | (2014.01) |
| *H04N 19/42* | (2014.01) |

(52) U.S. Cl.
CPC ........... *H04N 19/895* (2014.11); *G06V 10/25* (2022.01); *G06V 20/46* (2022.01); *H04N 19/136* (2014.11); *H04N 19/167* (2014.11); *H04N 19/172* (2014.11); *H04N 19/184* (2014.11); *H04N 19/42* (2014.11)

(58) Field of Classification Search
CPC .. H04N 19/895; H04N 19/136; H04N 19/167; H04N 19/172; H04N 19/184; H04N 19/42; G06V 10/25; G06V 20/46
See application file for complete search history.

(56) References Cited

U.S. PATENT DOCUMENTS

| | | | |
|---|---|---|---|
| 9,576,340 B2 | 2/2017 | Pajak et al. | |
| 11,102,516 B2 | 8/2021 | Kottana et al. | |
| 11,610,122 B2 | 3/2023 | Karras et al. | |
| 2004/0228403 A1 * | 11/2004 | Yu .......................... | H04N 19/17 375/240.03 |
| 2005/0195903 A1 | 9/2005 | Karandikar et al. | |
| 2008/0144725 A1 * | 6/2008 | Henocq ................. | H04N 19/89 375/E7.174 |
| 2009/0148058 A1 * | 6/2009 | Dane .................... | H04N 19/577 382/251 |

(Continued)

FOREIGN PATENT DOCUMENTS

| | | | | | |
|---|---|---|---|---|---|
| CN | 101982977 A | * | 3/2011 | ............. | H04N 19/89 |
| CN | 107529061 A | * | 12/2017 | ........... | H04N 19/467 |

(Continued)

*Primary Examiner* — Tracy Y. Li
(74) *Attorney, Agent, or Firm* — Foley & Lardner LLP

(57) ABSTRACT

In various examples, systems and methods are disclosed relating to context-aware error concealment to improve inference accuracy are disclosed. A system can identify a frame of a video stream and determine that the frame comprises corrupted or lost data. The system can generate a corrected frame by applying an error concealment function selected based at least on a location of the corrupted or lost data in the frame and a region of interest in the frame.

15 Claims, 9 Drawing Sheets

100 →

(56)　　　　　References Cited

U.S. PATENT DOCUMENTS

| 2014/0198839 | A1 |  | 7/2014 | Potdar et al. |
| 2014/0211842 | A1 | * | 7/2014 | Zhao ...................... H04N 19/19 |
| | | | | 375/240.02 |
| 2019/0297326 | A1 |  | 9/2019 | Reda et al. |

FOREIGN PATENT DOCUMENTS

| WO | WO-2022154686 | A1 | * | 7/2022 | ............. H04N 19/30 |
| WO | WO-2025127957 | A1 | * | 6/2025 | ............. G06N 3/084 |

* cited by examiner

600

IDENTIFY A FRAME OF A VIDEO STREAM
B602

DETERMINE THAT THE FRAME INCLUDES CORRUPTED OR
LOST DATA
B604

GENERATE A CORRECTED FRAME BY APPLYING AN ERROR
CONCEALMENT FUNCTION SELECTED BASED AT LEAST ON A
LOCATION OF THE CORRUPTED OR LOST DATA IN THE
FRAME AND A REGION OF INTEREST IN THE FRAME
B606

900

CONTEXT-AWARE ERROR CONCEALMENT TO IMPROVE INFERENCE ACCURACY

BACKGROUND

Video streaming involves encoding and transmitting video data over a network to a remote client device, which subsequently decodes the video. One drawback to video streaming is the occurrence of lost video data during streaming, which may be caused by factors such as network latency and packet loss. Packet loss may cause significant artifacts or latency that can have a detrimental effect on the overall streaming experience. Data that is corrupted or lost in video streams can affects the accuracy of artificial intelligence predictions/inferences operations on the video stream.

SUMMARY

Embodiments of the present disclosure relate to context-aware error concealment in video streams to improve the accuracy of artificial intelligence operations. The systems and methods described herein improve upon conventional error concealment techniques by selectively applying error concealment depending on the location of detected corruption/loss in video data. Unlike conventional approaches, which apply computationally expensive error concealment functions to every part of every frame and thereby degrade artificial intelligence performance, the techniques described herein can be used to selectively apply error concealment to portions of a frame that are most relevant to downstream artificial intelligence operations. In some implementations or scenarios, error concealment may not be applied even when corruption or data loss is detected. This significantly reduces the required computational resources to apply error concealment to video stream data, thereby improving the performance of downstream artificial intelligence operations.

At least one aspect relates to one or more processors. The one or more processors can include one or more circuits. The one or more circuits can identify a frame of a video stream. The one or more circuits can determine that the frame comprises corrupted or lost data. The one or more circuits can generate a corrected frame by applying an error concealment function selected based at least on a location of the corrupted or lost data in the frame and/or a region of interest in the frame.

In some implementations, the one or more circuits can select the error concealment function based at least on the location of the corrupted or lost data being within the region of interest in the frame. In some implementations, the one or more circuits can generate the corrected frame by applying the error concealment function to at least a portion of the region of interest. In some implementations, the one or more circuits can apply the error concealment function by providing the frame as input to a machine-learning model.

In some implementations, the one or more circuits can receive an encoded bitstream of the video stream. In some implementations, the one or more circuits can generate the frame by decoding the encoded bitstream, wherein decoding the frame indicates the location of the corrupted or lost data. In some implementations, the error concealment function is a first error concealment function of a plurality of error concealment functions. In some implementations, the one or more circuits can determine that an object is detected in a predetermined number of prior frames in the video stream. In some implementations, the one or more circuits can select the first error concealment function from the plurality of error concealment functions based at least on the object being detected in the predetermined number of prior frames. The first error concealment function can use a greater amount of computing resources relative to a second error concealment function of the plurality of error concealment functions. In some implementations, the one or more circuits can generate the corrected frame by applying the first error concealment function to at least one portion of the frame in which the object is estimated to appear. In some implementations, the one or more circuits can determine that the corrupted or lost data is located outside of the region of interest. In some implementations, the one or more circuits can select the first error concealment function from the plurality of error concealment functions based at least on the corrupted or lost data being located outside of the region of interest, the first error concealment function using a lesser amount of computing resources relative to a second error concealment function of the plurality of error concealment functions.

At least one aspect relates to a system. The system can include one or more processors. The system can receive a request to process a video stream comprising a plurality of frames. The system can apply an error concealment function to at least one frame of the plurality of frames, the error concealment function selected based at least on a location of corrupted or lost data in the at least one frame and a region of interest in the at least one frame. The system can execute a machine-learning model using the at least one frame as input for the request.

In some implementations, the system can determine that the at least one frame comprises corrupted or lost data using a decoding process. In some implementations, the machine-learning model generates an indication of an object in the at least one frame. In some implementations, the system can select a second error concealment function for at least one second frame of the plurality of frames based at least on the indication of the object in the at least one frame.

In some implementations, the second error concealment function for the at least one second frame is selected further based on an expected location of the object in the at least one second frame. In some implementations, the location of the corruption or data loss is one of a macroblock location or a slice location of the at least one frame. In some implementations, the system can apply the error correction function by executing a second machine-learning model using the at least one frame as input, the second machine-learning model to generate replacement information for the corrupted or lost data of the at least one frame.

At least one aspect is related to a method. The method can include identifying, using one or more processors, a frame of a video stream. The method can include determining, using the one or more processors, that the frame comprises corrupted or lost data. The method can include generating, using the one or more processors, a corrected frame by applying an error concealment function selected based at least on a location of the corrupted or lost data in the frame and a region of interest in the frame.

In some implementations, the method includes selecting, using the one or more processors, the error concealment function based at least on the location of the corrupted or lost data being within the region of interest in the frame. In some implementations, the method includes generating, using the one or more processors, the corrected frame by applying the error concealment function to at least a portion of the region of interest.

The processors, systems, and/or methods described herein can be implemented by or included in at least one of a control system for an autonomous or semi-autonomous machine, a perception system for an autonomous or semi-autonomous machine, a system for performing simulation operations, a system for performing digital twin operations, a system for performing light transport simulation, a system for performing collaborative content creation for 3D assets, a system for performing deep learning operations, a system for performing generative AI operations using a large language model (LLM), a system for performing generative AI operations using a vision language model (VLM), a system implemented using an edge device, a system implemented using a robot, a system for performing conversational AI operations, a system for generating synthetic data, a system incorporating one or more virtual machines (VMs), a system implemented at least partially in a data center, or a system implemented at least partially using cloud computing resources.

BRIEF DESCRIPTION OF THE DRAWINGS

The present systems and methods for context-aware error concealment to improve inference accuracy are described in detail below with reference to the attached drawing figures, wherein.

DETAILED DESCRIPTION

Figure 1:
FIG. 1 is a block diagram of an example system for implementing context-aware error concealment to improve inference accuracy, in accordance with some embodiments of the present disclosure.
Figure 1:
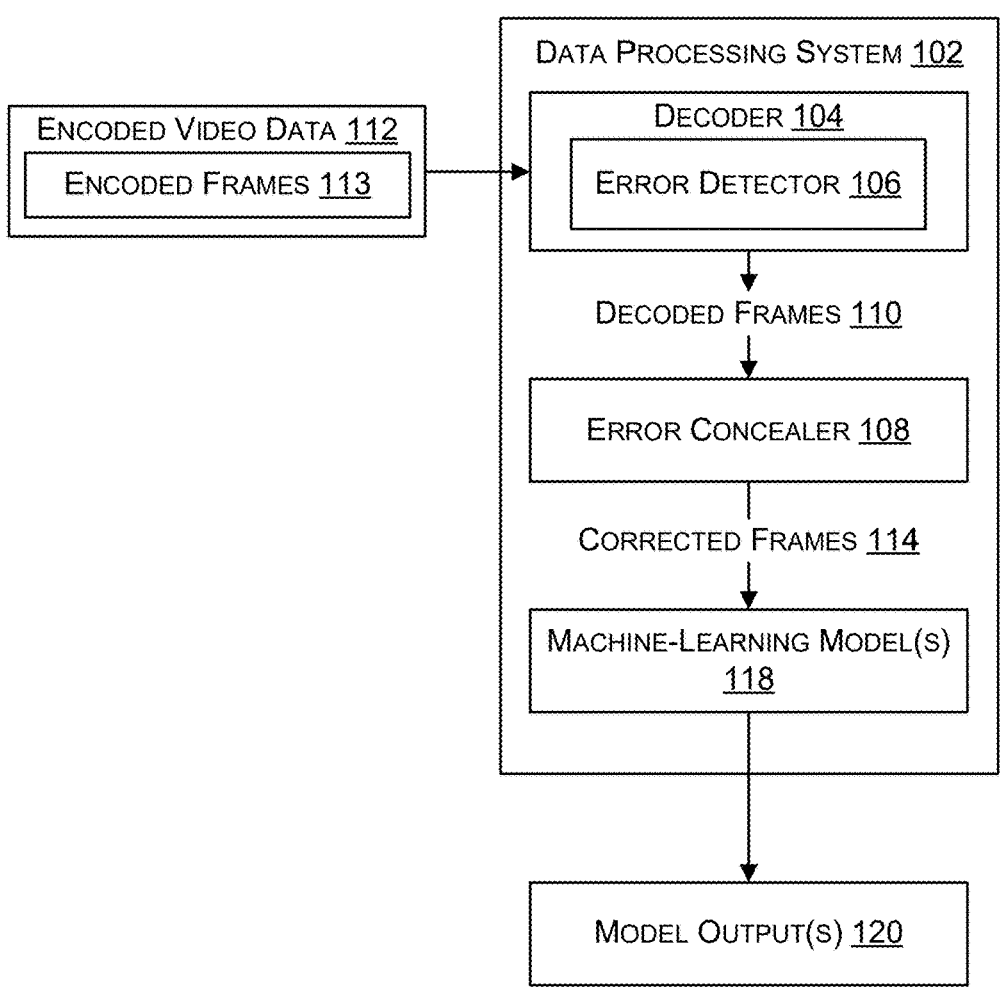

This disclosure relates to systems and methods for implementing context-aware error concealment in video streams, which may be applied to improve the accuracy of machine-learning operations. The error concealment techniques described herein can be performed by systems that transmit video data or data derived from video data, including security systems, artificial intelligence pipelines, or general video streaming platforms.

These techniques are particularly useful in unreliable or noisy networks, which may drop packets or corrupt transmitted data. Video streaming can be performed by transmitting packets via a streaming protocol, such as real-time streaming protocol (RTSP). Such streaming protocols transmit video data that is encoded into a "bitstream" to improve throughput and accuracy. If portions of a bitstream are corrupted or lost, corresponding video frame information is also lost when decoded at the receiver of the video stream. In artificial intelligence systems that perform inference on decoded video data, missing or corrupted portions of frames can affect detection or tracking accuracy.

Conventional error concealment approaches that attempt to mitigate corruption or data loss result in decreased inference performance, because high-quality and computationally intensive error concealment techniques are applied to every frame in the video stream having corrupted or lost data. To address these deficiencies, the systems and methods described herein dynamically select from different approaches for error concealment depending on the location of the lost or corrupted frame data. In some implementations, error concealment may not be applied even when corruption or data loss is detected.

To do so, the systems and methods described herein can use a region of interest in the frame that corresponds to the most-relevant portions of the frame for inference detection, classification, segmentation, or other machine-learning tasks. This may be a predetermined or dynamically determined region and may correspond to portions of the video stream that are most likely to depict objects subject to the artificial intelligence operations. For example, the region of interest may be a portion near the center of the video frame. To improve overall performance, the system and methods described herein can select the optimal error concealment technique depending on whether data corruption or data loss in the video frame occurs within or proximate to any region(s) of interest in a video frame.

In one example, if corruption or data loss occurs outside region(s) of interest in a video frame, error concealment techniques having a low computational burden can be selected. In some implementations, error concealment may not be performed if the data loss or corruption occurs outside of the region(s) of interest. In another example, if corruption or data loss occurs within region(s) of interest in a video frame, a high quality and computationally intensive error concealment technique can be applied to improve the accuracy of machine-learning inference. One example of computationally intensive error concealment is the use of a generative artificial intelligence model that receives a corrupted frame as input and generates an uncorrupted video frame as output.

The error concealment technique selected for video frames may depend on whether objects have been recently detected within one or more region(s) of interest in a video stream. For example, if an object has not been detected in the region(s) of interest of a video stream within a predetermined number of recent consecutive frames, error concealment techniques having a low computational burden can be selected. In another example, if an object has been detected in one or more region(s) of interest of the video stream within a predetermined number of recent consecutive frames, high quality and computationally intensive error concealment technique(s) can be applied.

Error concealment techniques may also be selectively applied to different portions (e.g., macroblocks) of the video frame when aggregate data loss or corruption occurs. For example, if data packets corresponding to a slice of video data are lost or corrupted, error concealment may only be applied to portions (e.g., macroblocks) of the video frame that correspond to one or more region(s) of interest, rather than the entirety of the video frame. Similar approaches may be used to selectively apply error concealment for portions of the region(s) of interest in which an object is estimated to appear, based at least on the detection of the object in prior video frames.

With reference to FIG. 1, FIG. 1 is an example computing environment including a system for implementing context-aware error concealment to improve inference accuracy, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The system 100 is shown as including a data processing system 102 that receives encoded video data 112, which can be an encoded bitstream of a video stream with encoded frames 113. The data processing system 102 can implement the various techniques described herein to conceal errors in the encoded video data 112 to improve inference accuracy. The data processing system 102 can receive the encoded video data 112, for example, from one or more computer networks. In some implementations, the data processing system 102 can access the encoded video data from a data repository or storage system. The storage system may be an external server, distributed storage/computing environment (e.g., a cloud storage system), or any other type of storage device or system that is in communication with the data processing system 102. In some implementations, the storage system may form a part of, or may otherwise be internal to, the data processing system 102. In such implementations, the data processing system 102 can access the encoded video data 112 from internal memory.

The data processing system 102 may access, retrieve, or otherwise receive the encoded video data 112 in response to receiving a request to process the encoded video data 112. The request may be provided by a device external to and in communication with the data processing system 102 (e.g., a client device communicating via a network). In some implementations, the request may be provided in response to input at the data processing system 102, for example, by an operator of the data processing system 102. The request may specify the encoded video data 112 to process or a location from which the encoded video data 112 is to be retrieved by the data processing system.

The encoded video data 112 is shown as including one or more encoded frames 113. The encoded video data 112 can be an encoded bitstream for video data generated by one or more video capture devices (e.g., video cameras, security cameras, integrated webcams or smartphone cameras, etc.) or applications that generate video frames (e.g., remote gaming applications, remote desktop applications, etc.). The encoded video data 112 may be generated from any suitable source, including a video playback process, a gaming process (e.g., video output from remotely executing video games), among other sources of video data. The encoded video data 112 may include information relating to the frames of the video stream, including the resolution, frame rate, or other attributes of the video stream. The encoded video data 112 can be encoded according to any suitable codec standard, including but not limited to codec standards such as h.264 (AVC), h.265 (HEVC), h.266 (VVC), AV1, VP8, VP9, or any other video codec that supports segmentation of a video frame into distinct geometric regions, such as slices or macroblocks. Frame data in the encoded video data 112 may be encoded as one or more encoded frames 113.

The encoded video frames 113 are shown as being stored as part of the encoded video data 112. The decoder can be or include software, hardware, or combinations of hardware and software. Each frame within the encoded video data 112 can be an independent unit of encoded data and may be compressed using various techniques to reduce redundancy between sequential frames. The encoded frames 113 and/or the encoded video data 112 may include metadata that describes the structure and properties of each frame, such as frame type (I-frame, P-frame, B-frame), size, timestamp, and dependencies on other frames. Data for the encoded frames 113 can be stored as part of the encoded video data 112 sequentially or in an interleaved manner, in some implementations.

The data processing system 102 can execute a decoder 104 to decode the encoded video data 112. To do so, the decoder 104 can parse the encoded video data 112 to extract any associated video metadata, such as the frame size, frame rate, and audio sample rate. The decoder 104 can identify the codec based at least on the metadata and decode the encoded video data 112 using the identified codec to generate frames of the video stream and/or audio data. In some implementations, such video metadata may be accessed separately from the encoded video data 112 (e.g., stored separately or provided separately in one or more network packets, etc.). Decoding the encoded video data 112 can include decompressing or performing the inverse of any encoding operations used to generate the encoded video data 112.

The decoded data generated from the encoded video data 112 is stored as the decoded frame(s) 110. The decoded frame(s) 110 can include raw video frame data (e.g., a collection of pixels at the resolution of the video stream). The decoded frames 110 may be stored in a frame buffer or another region of memory at the data processing system 102 to be processed by the machine-learning model(s) 118 and/or the error concealer 108. As shown, in this example, the decoded frames 110 are provided to the error concealer 108. In some implementations, each decoded frame 110 can be processed by the error concealer 108 sequentially. In some implementations, the decoded frames 110 can be processed by the error concealer 108 in a batch (e.g., once a predetermined number of decoded frames 110 have been generated).

The decoder 104 is shown as including an error detector 106. The error detector 106 can include software, hardware, or combinations of hardware and software, and can be used to detect errors in the encoded frames 113 while decoding the encoded video data 112. The error detector 106 can detect errors resulting from corrupted or lost data in the encoded video data 112. As the encoded video data 112 may include streamed video data from one or more video capture systems, portions of the encoded video data 112 may be corrupted or lost during transmission. In implementations where the encoded video data 112 is stored in a repository or storage system, corruption may have occurred at the repository/store system or while being transmitted to the repository/store system.

Corruption in the encoded video data 112 may include lost portions of one or more encoded frames 113, which results in information in the frames being unable to be properly reconstructed. These portions can be detected by the error detector 106 using various techniques such as parity checks, checksums, or error detection approaches implementing cyclic redundancy checks (CRC). In some implementations, the encoded video data 112 may be or include one or more portions of an encoded bitstream, and the error detector 106 can detect instances of missing portions of encoded frames 113 by identifying missing portions of the encoded bitstream corresponding to the encoded frames 113. For example, while the decoder 104 is decoding the encoded video data 112, the error detector 106 can scan the bitstream for inconsistencies or anomalies that indicate corruption. Doing so may include accessing data corresponding to the encoded frames 113 to detect deviations from expected patterns, including but not limited to discrepancies in frame size, unexpected interruptions in the encoded bitstream, or incorrect checksum values.

Any encoded frames 113 detected as having missing or corrupted data by the error detector 106 can be flagged for error concealment. The flags may be stored as part of metadata included in the decoded frames 110. In some implementations, decoded frames 110 flagged as including corrupted or lost data can be stored with an indication that corruption/data loss is present. In some implementations, the error detector 106 can determine a location (e.g., pixel coordinates, coordinates of a region, identifier of one or more macroblocks, slices, or other geometric portions, etc.) within a decoded frame 110 that has been corrupted or lost. The location(s) of any corrupted or lost region(s) of a decoded frame 110 can be provided to the error concealer 108 as metadata for the decoded frame 110.

The decoder 104, upon generating the decoded video data for a frame of video, can provide any decoded frames 110 that include corrupted or lost data to the error concealer 108. The error concealer 108 can include software, hardware, or combinations of hardware and software, and can be executed to conceal errors detected in decoded frames 110 using a suitable error concealment function. The error concealer 108 can implement any suitable type of error concealment function to conceal regions of corrupted or lost data in the decoded frames 108, including but not limited to spatial concealment (e.g., interpolation), temporal concealment (e.g., substituting corrupted/lost pixels with corresponding pixels from previous frames), motion vector estimation-based prediction of corrupted or lost data, generative machine-learning techniques, or combinations thereof, among others.

The error concealer 108 can dynamically select one of many error concealment functions for a decoded frame 110 having corrupted or lost data based at least on the location of the corrupted or lost data in the decoded frame 110 and a region of interest in the decoded frame 110. The region of interest can be a predetermined or dynamically identified region of pixels in the decoded frame 110. The size, location, or other attributes of the region of interest can be identified in metadata of the encoded video data 112, extracted by the decoder 104, and provided to the error concealer 108 for processing. In some implementations, the size, location, or other attributes of the decoded frame 110 can be provided in metadata of the encoded video data 112 on a per-frame basis, in which each encoded frame 113 includes metadata identifying a respective region of interest.

In some implementations, the region of interest may be determined based at least on a source of the encoded video data 112. In one example, the data processing system 102 can store a data structure that maps different sources of encoded video data 112 (e.g., different capture devices, video data storage locations, client devices, etc.) to corresponding metadata relating to regions of interest. Upon receiving or identifying encoded video data 112, the error concealer 108 can access the data structure using the source of the encoded video data 112 to identify the size, location, or attributes of the region of interest for that video source. In some implementations, a region of interest may be discontinuous, and a decoded frame 110 may include multiple continuous regions of interest. Regions of interest may be different for different sequences of decoded frames 110. In some implementation, a size or location of a region of interest for a decoded frame 110 may be modified based at least on an output of one or more machine-learning models 118, as described in further detail herein.

The type of error concealment function used to conceal lost or corrupted data in a decoded frame 110 can be selected according to conditions including but not limited to a location and/or size of the lost or corrupted data in the decoded frame 110, whether the lost or corrupted data portion of the decoded frame 110 is within (or in some implementations, positioned before) the region of interest in the decoded frame 110, and/or whether one or more objects have been detected in the region of interest in one or more previous frames. Various examples of different conditions for selecting different error concealment functions are described in connection with FIGS. 3, 4, and 5.

Figure 3:
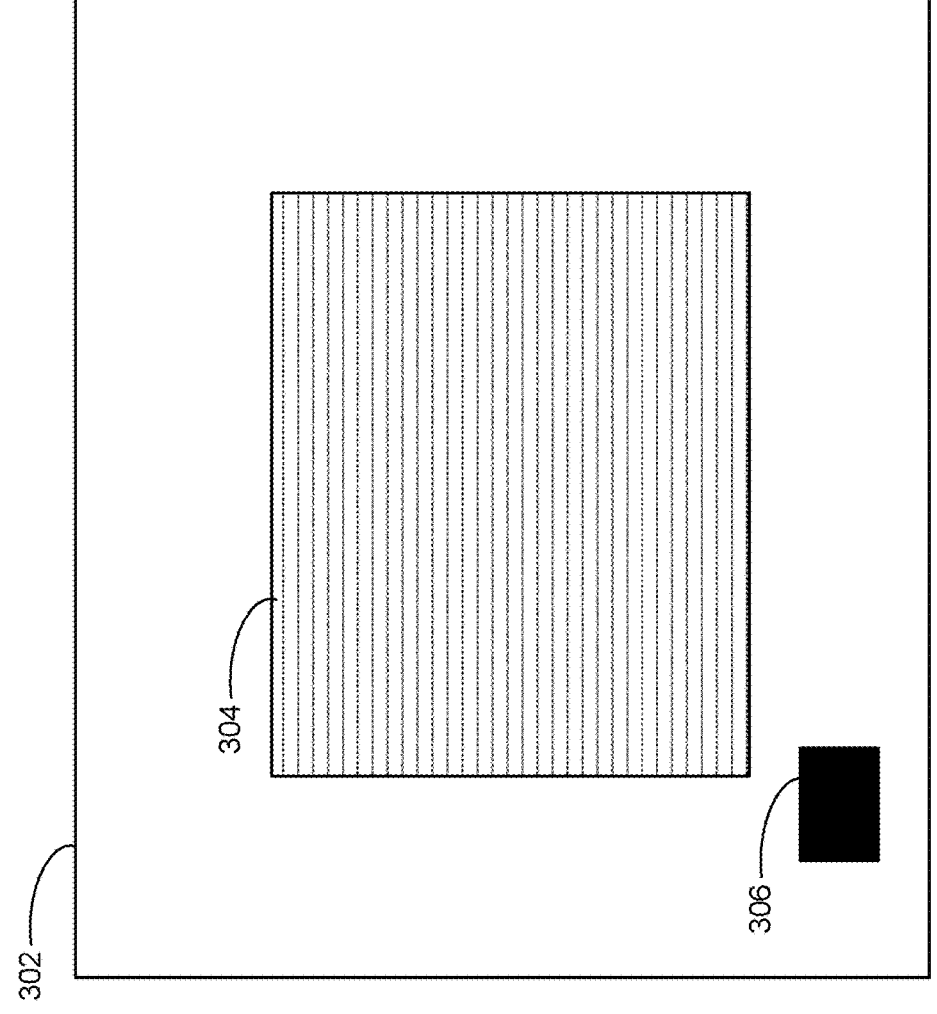
FIG. 3 is an example diagram showing how corrupted or lost encoded data affects video decoding, in accordance with some embodiments of the present disclosure.

Referring to FIG. 3 in the context of the components described in connection with FIG. 1, illustrated is an example diagram 300 showing how corrupted or lost encoded data affects video decoding, in accordance with some embodiments of the present disclosure. As shown, a frame 302 includes a region of interest 304 and a region of lost or corrupted data 306. Although the region of interest 304 is annotated with a horizontal line pattern, it should be understood that the region of interest 304 may not necessarily be visually presented in the frame 302. Further, although the region of interest 304 is shown as rectangular shape, it should be understood that any number of regions of interest 304 can be associated with a frame 302, and that the region(s) of interest 304 of the frame 302 can have any size, shape, or location.

As shown, in this example, the frame 302 includes a region of lost or corrupted data 306, which is positioned beneath and outside of the region of interest 304. In this example, the error concealer 108 can select an error concealment function having a relatively low computational impact, which may result in reduced quality in the region corresponding to lost or corrupted data following application of the error concealment function. In this example, as the region of lost or corrupted data 306 is outside of a region of interest, quality of that portion of the frame 302 is not necessarily relevant for downstream inference operations (e.g., object detection, segmentation, etc.). Therefore, error concealment function(s) that have relatively lower computational requirements at the cost of output quality for the corrected region can be used to dynamically improve the computational performance of the decoding process.

Non-limiting examples of low-complexity error concealment techniques that may be selected include low-complexity interpolation techniques (e.g., spatial concealment) or temporal concealment techniques, among others. Temporal concealment techniques can include using corresponding pixels from previous decoded frames 110 stored by the error concealer 108 in place of the region of lost or corrupted data 306. In some implementations, the error concealer 108 may not apply an error concealment function, and instead allow the decoded frame 110 to be processed according to the techniques described herein without modification. Further details of other selection criteria for error concealment functions are described in connection with FIGS. 4 and 5.

Referring back to FIG. 1, the error concealer 108 can apply the selected error concealment function to the decoded frames 110 to generate a sequence of corrected frames 114. The corrected frames 114 can include modified data of the decoded frames 110 generated by the selected error concealment function. The corrected frames 114 can be generated in the same order as the decoded frames 110. Any generated corrected frames 114 can be interleaved with decoded frames 110 that did not have any corrupted to lost data, such that the sequence of frames generated by the decoder 104 is preserved in the proper temporal order of the video stream.

As described herein, frames of the encoded video data 112 may correspond to security cameras, video capture devices, or other video generation software, and may depict various objects or features of interest. The regions of interest in the decoded frames 110 can correspond to regions of the decoded frames 110 in which the objects or features of interest are likely to occur. The corrected frames 114 (which may include decoded frames 110 for which error concealment need not have been applied) are provided to downstream processing tasks to detect the presence of one or more objects of interest. In this example, the corrected frames 114 are provided as input to the one or more machine-learning models 118.

The one or more machine-learning models 118 can be or include any type of machine-learning model trained/updated to process frames of a videos stream (e.g., the decoded frames 110, the corrected frames 114, etc.). For example, the one or more machine-learning models 118 can include one or more neural networks (e.g., deep neural networks (DNNs), convolutional neural networks (DNNs), recurrent neural networks (RNNs), fully connected networks, combinations thereof, etc.) that are trained/update for image classification, segmentation, or objection detection, among other machine-learning tasks. In some implementations, the one or more machine-learning models 118 may be or include other types of machine-learning models, such as linear or logistic regression models, decision tree models, or support vector machine models, among others, which process various data of the decoded frames 110 and/or corrected frames 114.

The data processing system 102 can, in some implementations, process one or more of the corrected frames 114 and/or decoded frames 110 (if no error correction is needed) as they are generated to detect one or more objects or features of interest positioned within the one or more regions of interest of the respective frames. In some implementations, pixels corresponding to the regions of interest may be extracted from a frame and subsequently provided as input to the machine-learning model(s) 118. In some implementations, the entirety of a frame can be provided as input to the machine-learning model(s) 118. In an example where the machine-learning model(s) 118 include a neural network, the data processing system 102 can execute the machine-learning model(s) 118 by providing the input data to be processed to one or more input layers or input data structures of the machine-learning model(s) 118 and performing the processing operations of each layer until one or more model output(s) 120 is generated.

As described herein, the machine-learning models 118 can include one or more object detection models that process at least the region(s) of interest of the corrected frames 114 and/or decoded frames 110 (if no error correction is needed). In such implementations, the model output(s) 120 can include indications of whether one or mor objects of interest were detected in the region(s) of interest in a frame. Such indications may include but are not limited to a flag indicating of the presence of one or more objects/features of interest, bounding box data for the one or more objects/features of interest, and/or classifications of one or more objects/features of interest detected in a frame. The model outputs 120 can be stored in association with the frame from which the model outputs 120 were generated. In some implementations, the model outputs 120 and/or any corresponding frames may be provided to other downstream processing systems or processes. The model outputs 120 may be provided to one or more external computing systems or stored in one or more data repositories/storage systems.

In some implementations, one or more of the model outputs 120 can be provided as input to the error concealer 108. For example, model outputs 120 that indicate an object/feature of interest is detected in a frame can be used to select error concealment functions for subsequent frames in the sequence of decoded frames 110. In some implementations, the data processing system 102 can initialize or otherwise store/maintain one or more counters that track the number of sequential corrected frames 114 in which an object/feature of interest is depicted within corresponding region(s) of interest. The counters can be provided to or implemented by the error concealer 108 to dynamically select different error concealment functions to improve the accuracy of the downstream inference operations performed using the machine-learning models. Various examples of different approaches for selecting error concealment functions for the decoded frames 110 are described in connection with FIGS. 4 and 5.

Figure 4:
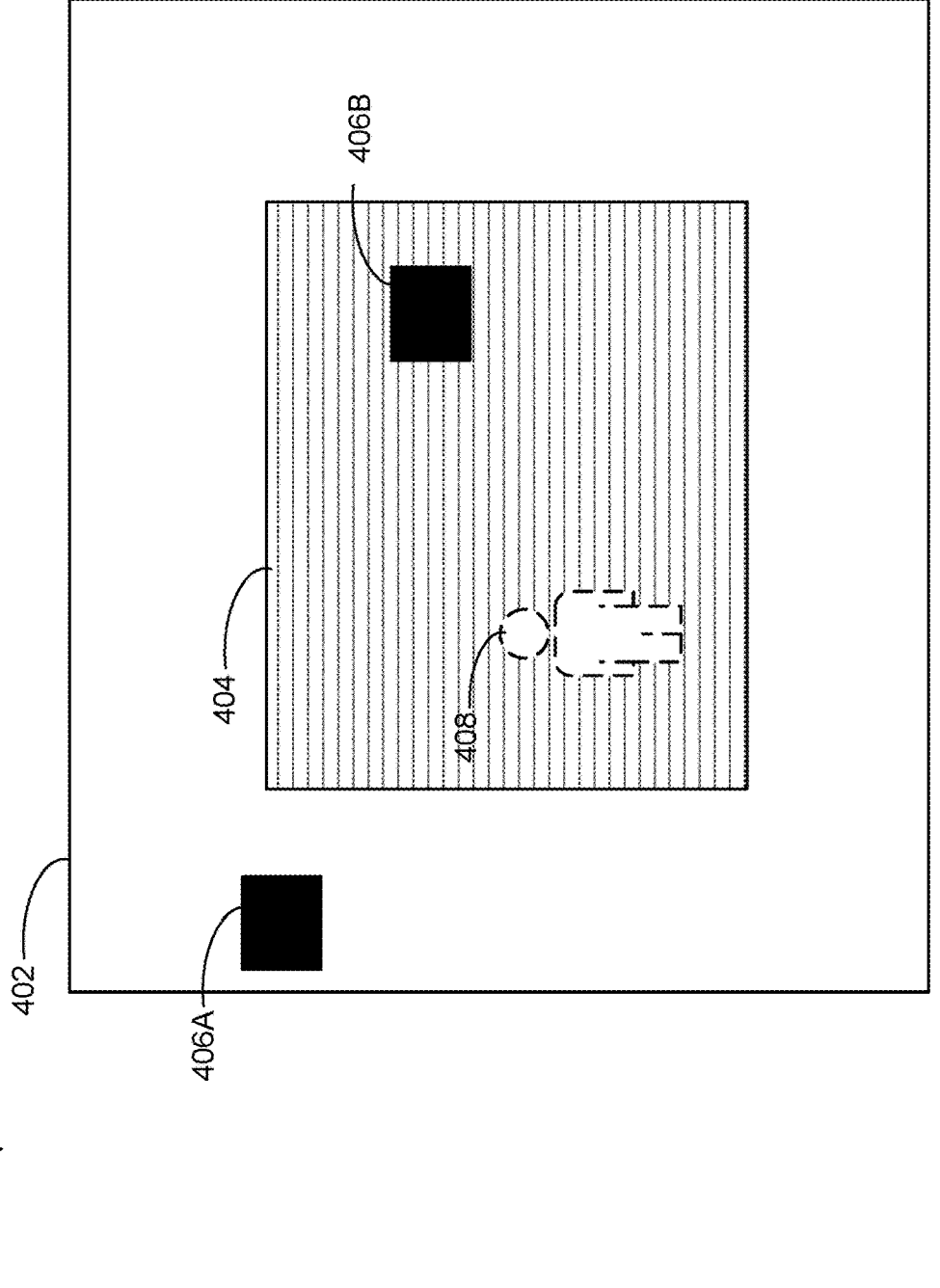
FIG. 4 is an example diagram showing how corrupted or lost data can occur in portion(s) of a video frame outside and inside a region of interest, in accordance with some embodiments of the present disclosure.

Referring to FIG. 4 in the context of the components described in connection with FIG. 1, illustrated is an example diagram 400 showing how corrupted or lost data can occur in portion(s) of a video frame outside and inside a region of interest, in accordance with some embodiments of the present disclosure. As shown, a frame 402 includes a region of interest 404 and regions of lost or corrupted data 406A and 406B (sometimes generally referred to as the "region(s) of lost or corrupted data 406"). In some implementations, one or more objects/features of interest 408 may be present in the frame 402 (shown here as a silhouette of a person).

In some implementations, the error concealer 108 can select an error concealment function based on whether the corrupted or lost data 406 is located before or within the region(s) of interest 404. In such scenarios, different error concealment functions may be selected depending on whether an object of interest 408 is detected within the region of interest in one or more previous frames. For example, corrupted or lost data 406 is located before or within the region(s) of interest 404 and an object/feature of interest 408 is not detected in one or more previous frames, a low-compute intensive error concealment function can be selected. As an object of interest 408 was not detected in prior frames, one is not necessarily expected to appear in the current frame 402, and therefore a less-accurate, low-compute intensive error concealment function can be applied to the frame 402 to address major artifacts and improve overall visualization can be used. Using an error concealment function that does not require significant computing power improves the performance of the overall computing system. Further, as no objects/features of interest 408 are necessarily expected to appear in the region of interest 404 (based on its absence in a predetermined number of previous sequential frames), inference accuracy is unlikely to be reduced even if the overall quality of the frame 402 is impacted by the corrupted or lost data 406.

Such approaches may be used even when the corrupted or lost data 406 appears before (e.g., in video data generated prior to decoding) the region of interest 404. In one example, encoded macroblock data for the frame 402 can be decoded from left to right in rows, starting from the top-left corner of the frame 402 and ending in the bottom-right corner of the frame. In this illustrated example, the portion of corrupted or lost data 406A is positioned in a row that precedes macroblocks making up the region of interest 404. As the decoding process can occur sequentially, the information decoded from the portion of corrupted or lost data 406A may affect the encoded macroblocks decoded as part of the region of interest 404 in subsequent frames. In such scenarios, concealing errors in the portion of corrupted or lost data 406A can improve the quality of subsequent frames, thereby improving overall inference accuracy across a sequence of frames. In some implementations, error concealment functions can be selected based on the proximity of any corrupted or lost data 406 to the region of interest 404. In another example, if the portion of corrupted or lost data 406 occurs in the same row as any macroblock of a region of interest 404, the corrupted or lost data 406 can be considered located in the region of interest 404 for the purposes of selecting an error concealment function.

In another example, if corrupted or lost data 406 is located before or within the region(s) of interest 404 and an object/feature of interest 408 has been detected in a predetermined number (e.g., four) of previous sequential frames, a high-compute intensive error concealment function can be selected to improve the quality of the frame 402. As an object/feature of interest 408 has been detected in a predetermined number of prior frames, the same object/feature of interest 408 is also likely to appear in the region of interest 404 of the current frame 402. To ensure that this object/feature of interest 408 is detected or otherwise accurately processed by the machine-learning model(s) 118, a more-accurate, higher-compute intensive error concealment function can be applied to the frame 402 to address major artifacts and improve overall visualization can be used. Non-limiting examples of error concealment include predicting the pixel values of missing/corrupted macroblocks using pixel data and/or motion vectors of previous frames, executing artificial intelligence models (e.g., machine learning models, deep learning models, generative artificial intelligence models, etc.) to portions of the frame 402 to replace the missing/corrupted data, and/or hybrid error concealment techniques (e.g., combinations of temporal and spatial error concealment), among others. Selectively applying error concealment function that use relatively more computational resources for certain frames, while using lower-accuracy and lower-resource intensive approaches in circumstances where objects/features of interest 408 are not likely to be detected, improves the performance of the system when processing many sequential frames of a video stream.

Figure 5:
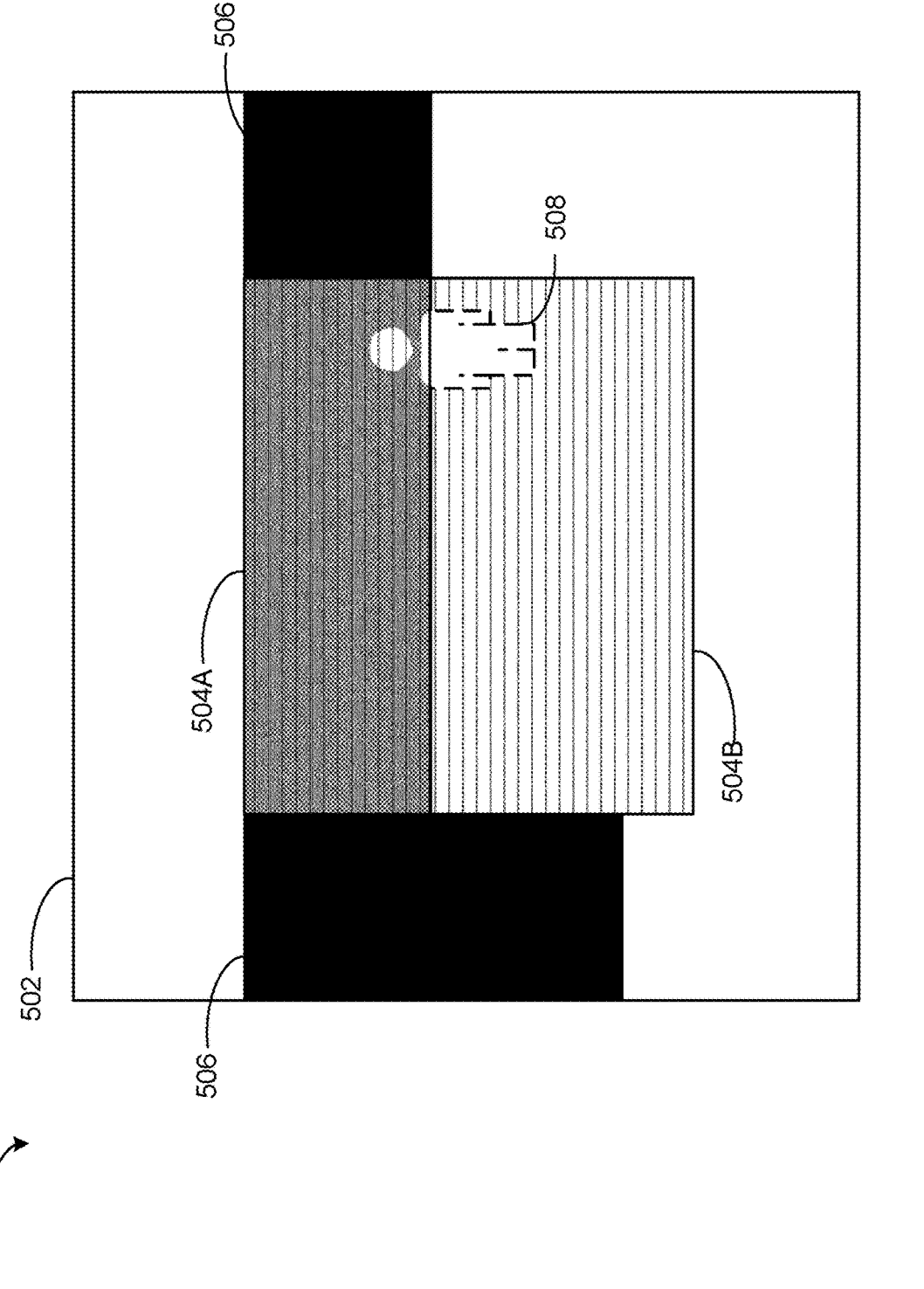
FIG. 5 is an example diagram showing larger segments of lost or corrupted data in a frame, in accordance with some embodiments of the present disclosure.

Referring to FIG. 5 in the context of the components described in connection with FIG. 1, illustrated is an example diagram 500 showing larger segments of lost or corrupted data in a frame, in accordance with some embodiments of the present disclosure. As shown, a frame 502 includes a top portion of a region of interest 504A that has been lost/corrupted, a bottom portion of the region of interest 504B that has not been lost/corrupted, and a large region of lost or corrupted data 506. The top portion 504A and the bottom portion 504B of the region of interest may collectively be referred to as the "region of interest 504." In some implementations, one or more objects/features of interest 508 may be present in the frame 502 (shown here as a silhouette of a person).

In some implementations, the error concealer 108 can select an error concealment function based on an amount of data in the frame 502 that are missing/corrupted. In this example, at least one slice of data represents a missing/corrupted portion of the frame 502, including the top portion of the region of interest 504A. In circumstances where a relatively large amount of data is missing/corrupted in a frame 502, the error concealer 108 can select an error concealment function that is applied only to certain portions (e.g., corrupted portions of the region of interest) of the frame, to improve computational efficiency of the system. In one example, if an object/feature of interest 508 has been detected in a predetermined number (e.g., four) of previous sequential frames, a high-quality and computationally intensive error concealment function can be selected to improve the quality of the frame 502. If the error concealer 108 determines that the amount of missing/corrupted data in the frame 502 exceeds a threshold, the error concealer 108 can selectively apply the high-quality and computationally intensive error concealment function only to missing/corrupted macroblocks corresponding to the region of interest. In this example, the error concealment function can be applied to the top portion of the region of interest 504A.

In another example, if an object/feature of interest 508 has been detected in a predetermined number (e.g., four) of previous sequential frames, a high-quality and computationally intensive error concealment function can be selected to improve the quality of the frame 502. If the error concealer 108 determines that the amount of missing/corrupted data in the frame 502 exceeds a threshold, the error concealer 108 can selectively apply the high-quality and computationally intensive error concealment function only to macroblocks that are predicted to include the object of interest 508 in the current frame 502. The error concealer 108 can use the detected location of an object of interest 508 in prior frames (e.g., as indicated in the model outputs 120) to estimate a location of the object of interest 508 in the current frame 502. In some implementations, the estimated location of the object of interest 508 in the current frame 502 can be determined based on motion vectors generated from the previous sequential frames, which when applied to macroblocks depicting the object of interest 508 in previous sequential frames can indicate the estimated location of the object of interest 508 in the current frame 502. In some implementations, the error concealment function may only be applied to macroblocks that are both estimated to depict the object of interest and are located within the region(s) of interest associated with the frame 502. Selectively applying high-quality error concealment functions for certain portions of frames (e.g., the region of interest, estimated locations of objects of interest, etc.), while using lower-accuracy and lower-resource intensive approaches in other circumstances improves the overall performance of the system when processing many sequential frames of a video stream.

In some implementations, if an object of interest 508 is detected in a predetermined number of frames, and the amount of missing/corrupt data in the frame 502 exceeds a threshold amount, the error concealer 108 can select an error concealment function that implements artificial intelligence models (e.g., machine learning models such as NVIDIA's Deep Learning Super Sampling (DLSS), generative artificial intelligence models, etc.) to regenerate portions of the frame 502. Such machine-learning model(s) can be trained/updated to receive a frame as input with missing/corrupted portions and generate an output frame that includes substitute pixels that are predicted to appear in the missing/corrupted portions. In some implementations, the machine-learning model(s) can receive information from previous frames to estimate the pixel values of missing/corrupted portions in the current frame 502. To perform processing using previous sequential frames, the error concealer 108 can store/maintain one or more data structures that store a sliding window of previously decoded/corrected frames, in addition to corresponding metadata and/or model outputs 120 associated with those frames.

Figure 2:
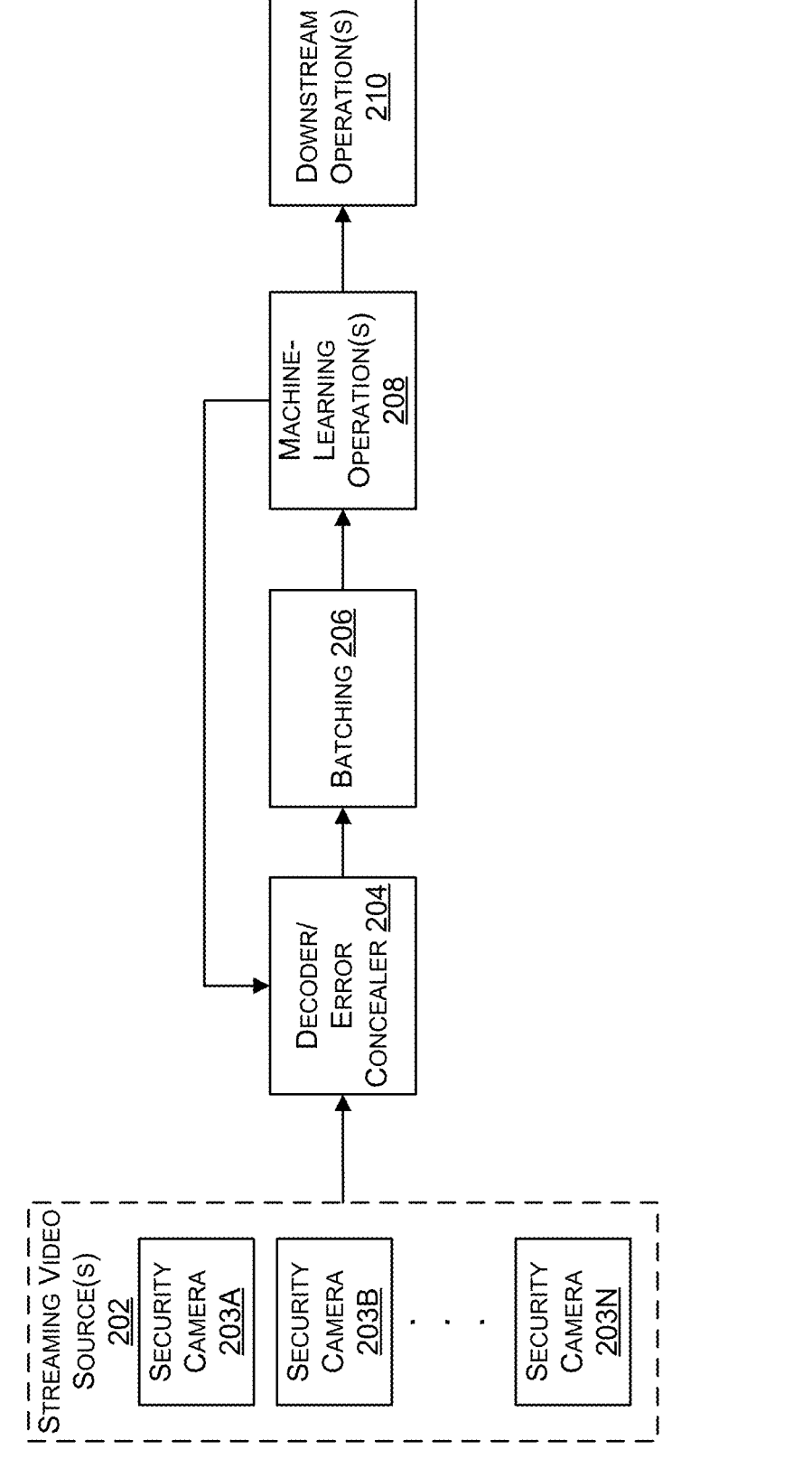
FIG. 2 shows an example data flow diagram showing how captured video data from security devices is processed according to the context-aware error concealment techniques described herein, in accordance with some embodiments of the present disclosure.

Referring to FIG. 2, illustrated is an example data flow diagram 200 showing how captured video data from security devices is processed in an environment including one or more security cameras, in accordance with some embodiments of the present disclosure. The data flow diagram 200 shows a set of streaming video sources 202, which in this example include the security cameras 203A-203N (sometimes generally referred to as the "security camera(s) 203"). The streaming video sources 202 can include any type of application or device that can generate or otherwise provide video data. The video data generated or captured by the streaming video sources 202 can be provided to the decoder/error concealer process 204, which may implement any of the functionality of the decoder 104 and the error concealer 108 of FIG. 1. In some implementations, a respective decoder/error concealer process 204 can be executed for each streaming video source 202 (e.g., each security camera 203). In some implementations, the decoder/error concealer process 204 can receive and process multiple video streams in parallel. The decoder/error concealer process 204 can be implemented in one or more computing systems (e.g., the data processing system 102, etc.).

As described herein, the output of the decoder/error concealer process 204 can include a sequence of corrected frames of decoded video data, which may be provided to a batching process 206. The batching process 206 can be used to aggregate decoded/corrected frame data into one or more data structures for processing in by a distributed machine-learning system (e.g., the data processing system 102). Aggregating the video data can include storing multiple frames in data structures that are compatible with different computing hardware, including graphics processing units (GPUs) or other distributed computing components/devices. The output of the batching process can be provided for processing using the machine-learning operations 208.

The machine-learning operations 208 can include any of the machine-learning models described herein (e.g., the machine-learning model(s) 118). The machine-learning operations 208 may include but are not limited to object/feature detection, segmentation, or classification, among others. The machine-learning operations 208 may be executed sequentially for each frame, or in some implementations, in parallel for multiple frames (e.g., as received from the output of the batching process 206). The machine-learning operations 208 can generate outputs (e.g., the model outputs 120) that may be provided to the decoder/error concealer process 204. For example, indications (e.g., locations, etc.) of whether previous frames depicted an object/feature of interest can be provided to the decoder/error concealer process 204 such that prior frames can influence the selection of error concealment functions for subsequent frames, as described herein. The outputs of the machine-learning operations 208 can be provided to one or more downstream operations 210, which may include storage in one or more data repositories/storage systems, encoding operations, video streaming operations, or other processing techniques.

Figure 6:
FIG. 6 is a flow diagram of an example of a method implementing context-aware error concealment to improve inference accuracy, in accordance with some embodiments of the present disclosure.
Figure 6:
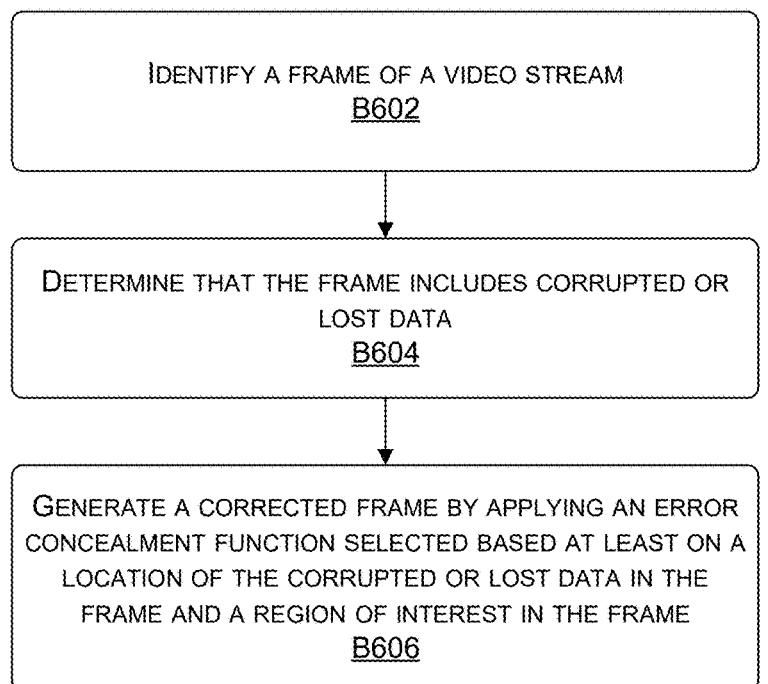

FIG. 6 is a flow diagram showing a method 600 for implementing context-aware error concealment to improve inference accuracy, in accordance with some embodiments of the present disclosure. Various operations of the method 600 can be implemented by the same or different devices or entities at various points in time. For example, one or more first devices may implement operations relating to decoding and correcting video data, and one or more second devices may implement operations relating to machine-learning operations (e.g., implementing the machine-learning models 118, etc.).

Each block of method 600, described herein, includes a computing process that may be performed using any combination of hardware, firmware, and/or software. For instance, various functions may be carried out by a processor executing instructions stored in memory. The method 600 may also be embodied as computer-usable instructions stored on computer storage media. The method 600 may be provided by a standalone application, a service or hosted service (standalone or in combination with another hosted service), or a plug-in to another product, to name a few. In addition, method 600 is described, by way of example, with respect to the systems of FIGS. 1 and 2. However, this method 600 may additionally or alternatively be executed by any one system, or any combination of systems, including, but not limited to, those described herein.

The method 600, at block B602, includes identifying a frame (e.g., a decoded frame 110, etc.) of a video stream (e.g., a stream of encoded video data 112). The frame of the video stream may be generated by decoding at least a portion of an encoded bitstream. In some implementations, the frame can be received from a decoder system (e.g., a computing system implementing the decoder 104, etc.). The frame can include raw pixel data having a resolution and color depth specified via metadata for the video stream. The frame may be part of a sequence of frames of the video stream. Each frame of the video stream can be processed according to the operations described herein. In some implementations, the frame can be an encoded frame (e.g., an encoded frame 113) that is to be decoded according to the techniques described herein.

The method 600, at block B604, includes determining whether the frame includes corrupted or lost data. Determining whether the frame has missing/corrupted data can be performed while decoding the frame. To do so, any of the operations described in connection with the decoder 104 and/or the error detector 106 of FIG. 1 may be performed. For example, various techniques as parity checks, checksums, or more advanced error detection may be used to detect whether information is missing or corrupted in the frame. In some implementations, instances of missing portions or corrupted portions of the frame can be identified by detecting missing/corrupted portions of an encoded bitstream of the video stream. For example, the bitstream can be scanned/analyzed for inconsistencies or anomalies that indicate corruption or missing data.

The method 600, at block B606, includes generating a corrected frame by applying an error concealment function selected based at least on a location of the corrupted or lost data in the frame and a region of interest in the frame. In one example, if the lost or corrupted data occurs outside the region of interest in the frame, a low-quality error concealment function that does not require significant computing resources can be selected. In some implementations, no error concealment function may be implemented if the lost or corrupted data occurs outside the region of interest in the frame. In another example, if the lost or corrupted data occurs within the region of interest (or in a region of the frame that may impact decoding of the region of interest), a higher-quality, and more computationally expensive, error concealment function can be selected.

In some implementations, the error concealment function can be selected according to whether an object of interest is detected in a predetermined number (e.g., two, three, four, etc.) previous sequential frames in the video stream. As described herein, one or more machine-learning models (e.g., the machine-learning models 118) can be used to detect the presence and location of objects/features of interest in a frame. In some implementations, if no object of interest is detected in a predetermined number of previous sequential frames and missing/corrupted data is detected within the region of interest in the frame, low-quality error concealment function that does not require significant computing resources can be selected. If an object of interest is detected in a predetermined number of previous sequential frames and missing/corrupted data is detected within the region of interest in the frame, a higher-quality, and more computationally expensive, error concealment function can be selected.

The amount of data that is missing/corrupted in the frame can affect which error concealment function is selected and/or how the error concealment function is applied. In one example, if an object of interest is detected in a predetermined number of previous sequential frames, and a large amount (e.g., entire slice(s), etc.) of missing/corrupted data is detected within the frame, a very high quality, and more computationally expensive, error concealment function can be selected. In some implementations, if an object of interest is detected in a predetermined number of previous sequential frames, and a large amount (e.g., entire slice(s), etc.) of missing/corrupted data is detected within the frame, the very high quality error concealment function may be applied to macroblocks in the frame where the object/feature of interest is estimated to appear. The estimated location of the object/feature of interest may be determined based on the location of the object/feature of interest in one or more prior frames.

In some implementations, if the amount of data that is missing/corrupted in the frame exceeds a threshold, generative machine-learning models may be used to reconstruct the missing/corrupted portions of the frame, as described herein. Once the error concealment function is selected, it can be applied to the frame to generate one or more corrected frames (e.g., the corrected frames 114). The corrected frames can be processed using one or more downstream processing operations, which may include processing using a machine-learning model (e.g., the machine-learning models 118).

Example Content Streaming System

Figure 7:
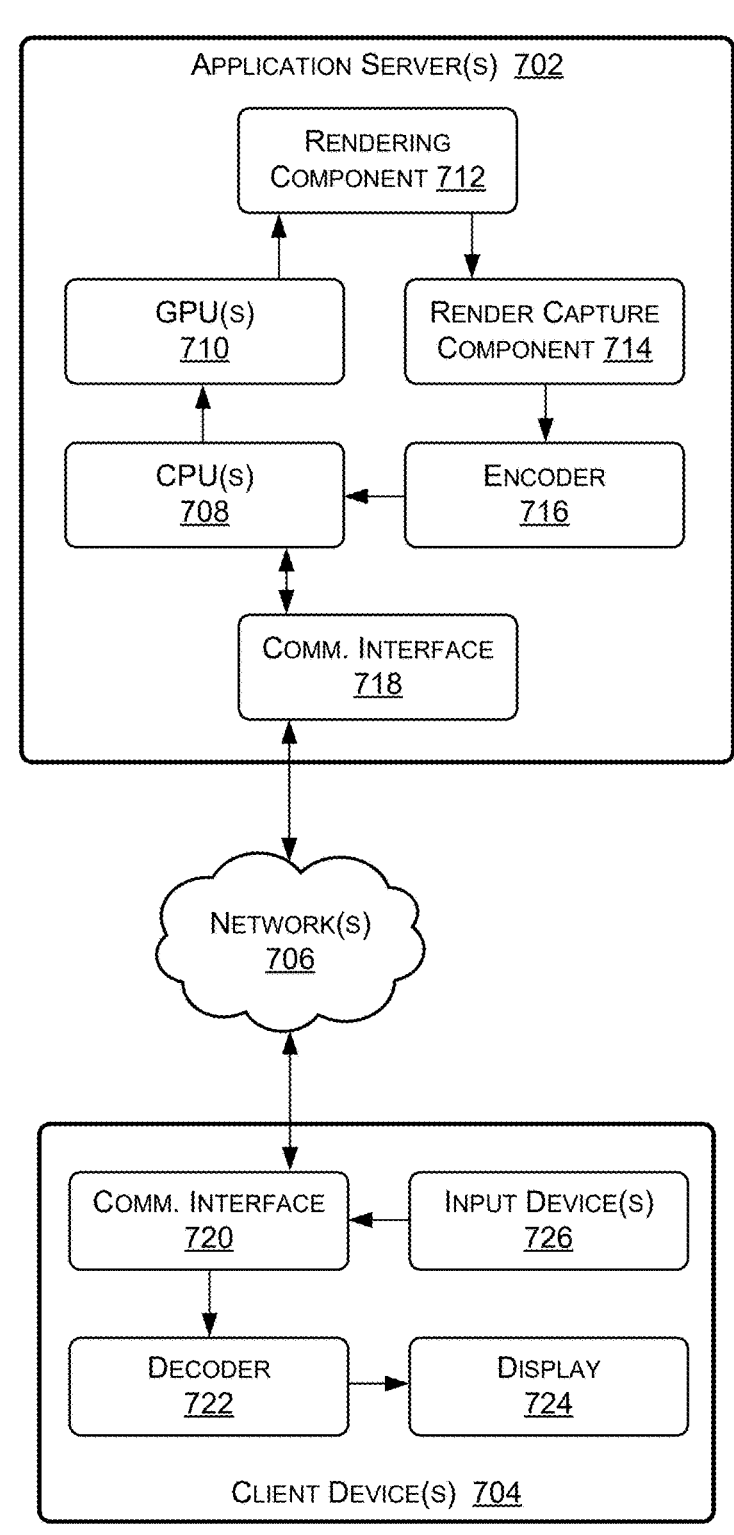
FIG. 7 is a block diagram of an example content streaming system suitable for use in implementing some embodiments of the present disclosure.

Now referring to FIG. 7, is an example system diagram for a content streaming system 700, in accordance with some embodiments of the present disclosure. FIG. 7 includes application server(s) 702 (which may include similar components, features, and/or functionality to the example computing device 800 of FIG. 8), client device(s) 704 (which may include similar components, features, and/or functionality to the example computing device 800 of FIG. 8), and network(s) 706 (which may be similar to the network(s) described herein). In some embodiments of the present disclosure, the system 700 may be implemented to conceal errors in video streams by selectively applying error concealment functions selected based on the locations and severity of corrupted/missing data. The application session may correspond to a game streaming application (e.g., NVIDIA GEFORCE NOW), a remote desktop application, a simulation application (e.g., autonomous or semi-autonomous vehicle simulation), computer aided design (CAD) applications, virtual reality (VR) and/or augmented reality (AR) streaming applications, deep learning applications, and/or other application types. For example, the system 700 can be implemented to receive input indicating one or more features of output to be generated using a neural network model, provide the input to the model to cause the model to generate the output, and use the output for various operations including display or simulation operations.

In the system 700, for an application session, the client device(s) 704 may only receive input data in response to inputs to the input device(s) 726, transmit the input data to the application server(s) 702, receive encoded display data from the application server(s) 702, and display the display data on the display 724. As such, the more computationally intense computing and processing is offloaded to the application server(s) 702 (e.g., rendering—in particular ray or path tracing—for graphical output of the application session is executed by the GPU(s) of the application server(s) 702). In other words, the application session is streamed to the client device(s) 704 from the application server(s) 702, thereby reducing the requirements of the client device(s) 704 for graphics processing and rendering.

For example, with respect to an instantiation of an application session, a client device 704 may be displaying a frame of the application session on the display 724 based at least on receiving the display data from the application server(s) 702. The client device 704 may receive an input to one of the input device(s) 726 and generate input data in response. The client device 704 may transmit the input data to the application server(s) 702 via the communication interface 720 and over the network(s) 706 (e.g., the Internet), and the application server(s) 702 may receive the input data via the communication interface 718. The CPU(s) 708 may receive the input data, process the input data, and transmit data to the GPU(s) 710 that causes the GPU(s) 710 to generate a rendering of the application session. For example, the input data may be representative of a movement of a character of the user in a game session of a game application, firing a weapon, reloading, passing a ball, turning on a vehicle, etc. The rendering component 712 may render the application session (e.g., representative of the result of the input data) and the render capture component 714 may capture the rendering of the application session as display data (e.g., as image data capturing the rendered frame of the application session). The rendering of the application session may include ray or path-traced lighting and/or shadow effects, computed using one or more parallel processing units—such as GPUs, which may further employ the use of one or more dedicated hardware accelerators or processing cores to perform ray or path-tracing techniques—of the application server(s) 702. In some embodiments, one or more virtual machines (VMs)—e.g., including one or more virtual components, such as vGPUs, vCPUs, etc.—may be used by the application server(s) 702 to support the application sessions. The encoder 716 may then encode the display data to generate encoded display data and the encoded display data may be transmitted to the client device 704 over the network(s) 706 via the communication interface 718. The client device 704 may receive the encoded display data via the communication interface 720 and the decoder 722 may decode the encoded display data to generate the display data. The client device 704 may then display the display data via the display 724.

Example Computing Device

Figure 8:
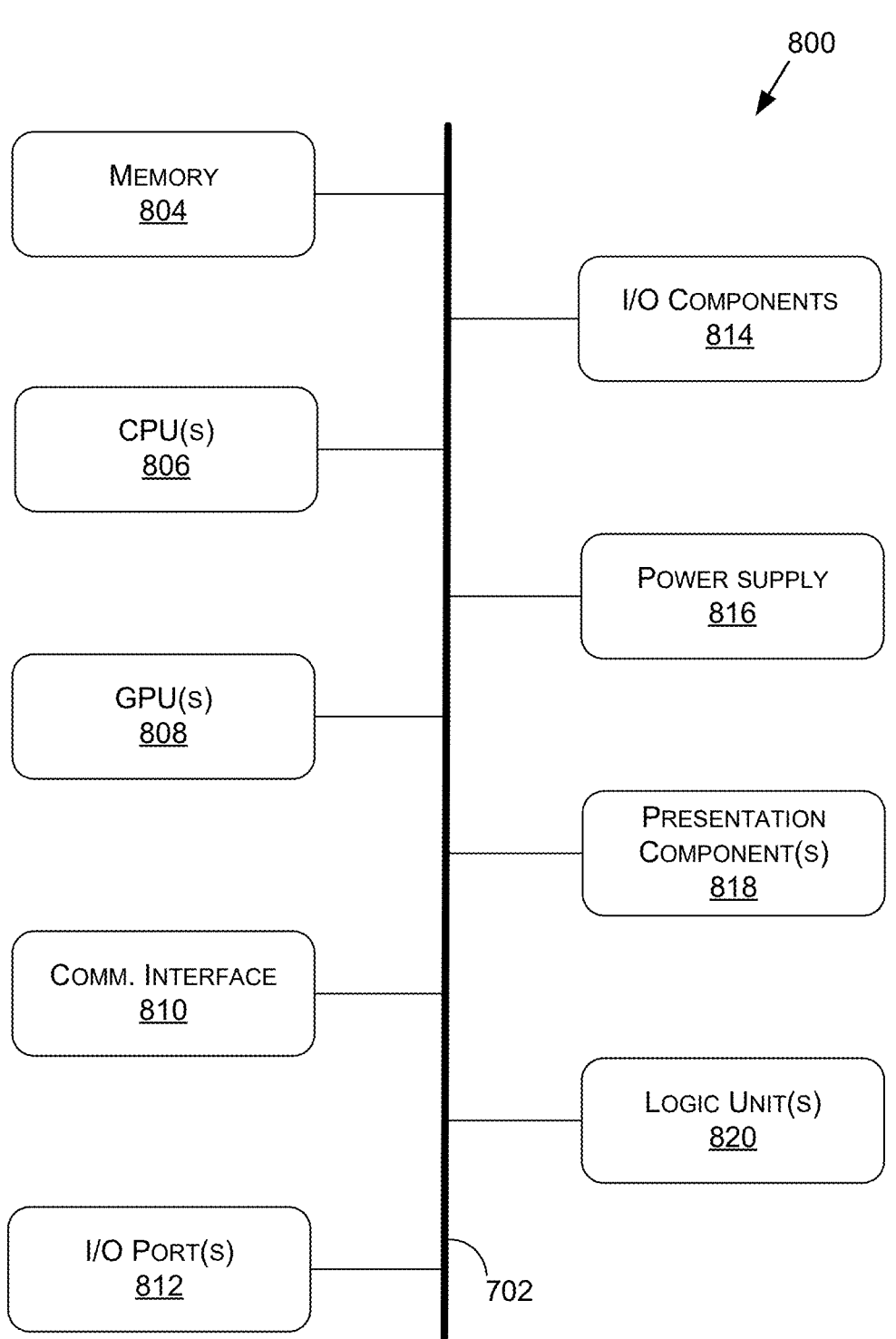
FIG. 8 is a block diagram of an example computing device suitable for use in implementing some embodiments of the present disclosure.

FIG. 8 is a block diagram of an example computing device(s) 800 suitable for use in implementing some embodiments of the present disclosure. Computing device 800 may include an interconnect system 802 that directly or indirectly couples the following devices: memory 804, one or more central processing units (CPUs) 806, one or more graphics processing units (GPUs) 808, a communication interface 810, input/output (I/O) ports 812, input/output components 814, a power supply 816, one or more presentation components 818 (e.g., display(s)), and one or more logic units 820. In at least one embodiment, the computing device(s) 800 may comprise one or more virtual machines (VMs), and/or any of the components thereof may comprise virtual components (e.g., virtual hardware components). For non-limiting examples, one or more of the GPUs 808 may comprise one or more vGPUs, one or more of the CPUs 806 may comprise one or more vCPUs, and/or one or more of the logic units 820 may comprise one or more virtual logic units. As such, a computing device(s) 800 may include discrete components (e.g., a full GPU dedicated to the computing device 800), virtual components (e.g., a portion of a GPU dedicated to the computing device 800), or a combination thereof.

Although the various blocks of FIG. 8 are shown as connected via the interconnect system 802 with lines, this is not intended to be limiting and is for clarity only. For example, in some embodiments, a presentation component 818, such as a display device, may be considered an I/O component 814 (e.g., if the display is a touch screen). As another example, the CPUs 806 and/or GPUs 808 may include memory (e.g., the memory 804 may be representative of a storage device in addition to the memory of the GPUs 808, the CPUs 806, and/or other components). In other words, the computing device of FIG. 8 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 8.

The interconnect system 802 may represent one or more links or busses, such as an address bus, a data bus, a control bus, or a combination thereof. The interconnect system 802 may be arranged in various topologies, including but not limited to bus, star, ring, mesh, tree, or hybrid topologies. The interconnect system 802 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 806 may be directly connected to the memory 804. Further, the CPU 806 may be directly connected to the GPU 808. Where there is direct, or point-to-point connection between components, the interconnect system 802 may include a PCIe link to carry out the connection. In these examples, a PCI bus need not be included in the computing device 800.

The memory 804 may include any of a variety of computer-readable media. The computer-readable media may be any available media that may be accessed by the computing device 800. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 804 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 800. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 806 may be configured to execute at least some of the computer-readable instructions to control one or more components of the computing device 800 to perform one or more of the methods and/or processes described herein. The CPU(s) 806 may each include one or more cores (e.g., one, two, four, eight, twenty-eight, seventy-two, etc.) that are capable of handling a multitude of software threads simultaneously. The CPU(s) 806 may include any type of processor and may include different types of processors depending on the type of computing device 800 implemented (e.g., processors with fewer cores for mobile devices and processors with more cores for servers). For example, depending on the type of computing device 800, the processor may be an Advanced RISC Machines (ARM) processor implemented using Reduced Instruction Set Computing (RISC) or an x86 processor implemented using Complex Instruction Set Computing (CISC). The computing device 800 may include one or more CPUs 806 in addition to one or more microprocessors or supplementary co-processors, such as math co-processors.

In addition to or alternatively from the CPU(s) 806, the GPU(s) 808 may be configured to execute at least some of the computer-readable instructions to control one or more components of the computing device 800 to perform one or more of the methods and/or processes described herein. One or more of the GPU(s) 808 may be an integrated GPU (e.g., with one or more of the CPU(s) 806 and/or one or more of the GPU(s) 808 may be a discrete GPU. In embodiments, one or more of the GPU(s) 808 may be a coprocessor of one or more of the CPU(s) 806. The GPU(s) 808 may be used by the computing device 800 to render graphics (e.g., 3D graphics) or perform general purpose computations. For example, the GPU(s) 808 may be used for General-Purpose computing on GPUs (GPGPU). The GPU(s) 808 may include hundreds or thousands of cores that are capable of handling hundreds or thousands of software threads simultaneously. The GPU(s) 808 may generate pixel data for output images in response to rendering commands (e.g., rendering commands from the CPU(s) 806 received via a host interface). The GPU(s) 808 may include graphics memory, such as display memory, for storing pixel data or any other suitable data, such as GPGPU data. The display memory may be included as part of the memory 804. The GPU(s) 808 may include two or more GPUs operating in parallel (e.g., via a link). The link may directly connect the GPUs (e.g., using NVLINK) or may connect the GPUs through a switch (e.g., using NVSwitch). When combined together, each GPU 808 may generate pixel data or GPGPU data for different portions of an output or for different outputs (e.g., a first GPU for a first image and a second GPU for a second image). Each GPU 808 may include its own memory or may share memory with other GPUs.

In addition to or alternatively from the CPU(s) 806 and/or the GPU(s) 808, the logic unit(s) 820 may be configured to execute at least some of the computer-readable instructions to control one or more components of the computing device 800 to perform one or more of the methods and/or processes described herein. In embodiments, the CPU(s) 806, the GPU(s) 808, and/or the logic unit(s) 820 may discretely or jointly perform any combination of the methods, processes and/or portions thereof. One or more of the logic units 820 may be part of and/or integrated in one or more of the CPU(s) 806 and/or the GPU(s) 808 and/or one or more of the logic units 820 may be discrete components or otherwise external to the CPU(s) 806 and/or the GPU(s) 808. In embodiments, one or more of the logic units 820 may be a coprocessor of one or more of the CPU(s) 806 and/or one or more of the GPU(s) 808.

Examples of the logic unit(s) 820 include one or more processing cores and/or components thereof, such as Data Processing Units (DPUs), Tensor Cores (TCs), Tensor Processing Units(TPUs), Pixel Visual Cores (PVCs), Vision Processing Units (VPUs), Image Processing Units (IPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 810 may include one or more receivers, transmitters, and/or transceivers that allow the computing device 800 to communicate with other computing devices via an electronic communication network, including wired and/or wireless communications. The communication interface 810 may include components and functionality to allow communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 820 and/or communication interface 810 may include one or more data processing units (DPUs) to transmit data received over a network and/or through interconnect system 802 directly to (e.g., a memory of) one or more GPU(s) 808. In some embodiments, a plurality of computing devices 800 or components thereof, which may be similar or different to one another in various respects, can be communicatively coupled to transmit and receive data for performing various operations described herein, such as to facilitate latency reduction.

The I/O ports 812 may allow the computing device 800 to be logically coupled to other devices including the I/O components 814, the presentation component(s) 818, and/or other components, some of which may be built in to (e.g., integrated in) the computing device 800. Illustrative I/O components 814 include a microphone, mouse, keyboard, joystick, game pad, game controller, satellite dish, scanner, printer, wireless device, etc. The I/O components 814 may provide a natural user interface (NUI) that processes air gestures, voice, or other physiological inputs generated by a user. In some instances, inputs may be transmitted to an appropriate network element for further processing, such as to modify and register images. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may include depth cameras, such as stereoscopic camera systems, infrared camera systems, RGB camera systems, touchscreen technology, and combinations of these, for gesture detection and recognition. Additionally, the computing device 800 may include accelerometers or gyroscopes (e.g., as part of an inertia measurement unit (IMU)) that allow detection of motion. In some examples, the output of the accelerometers or gyroscopes may be used by the computing device 800 to render immersive augmented reality or virtual reality.

The power supply 816 may include a hard-wired power supply, a battery power supply, or a combination thereof. The power supply 816 may provide power to the computing device 800 to allow the components of the computing device 800 to operate.

The presentation component(s) 818 may include a display (e.g., a monitor, a touch screen, a television screen, a heads-up-display (HUD), other display types, or a combination thereof), speakers, and/or other presentation components. The presentation component(s) 818 may receive data from other components (e.g., the GPU(s) 808, the CPU(s) 806, DPUs, etc.), and output the data (e.g., as an image, video, sound, etc.).

Example Data Center

Figure 9:
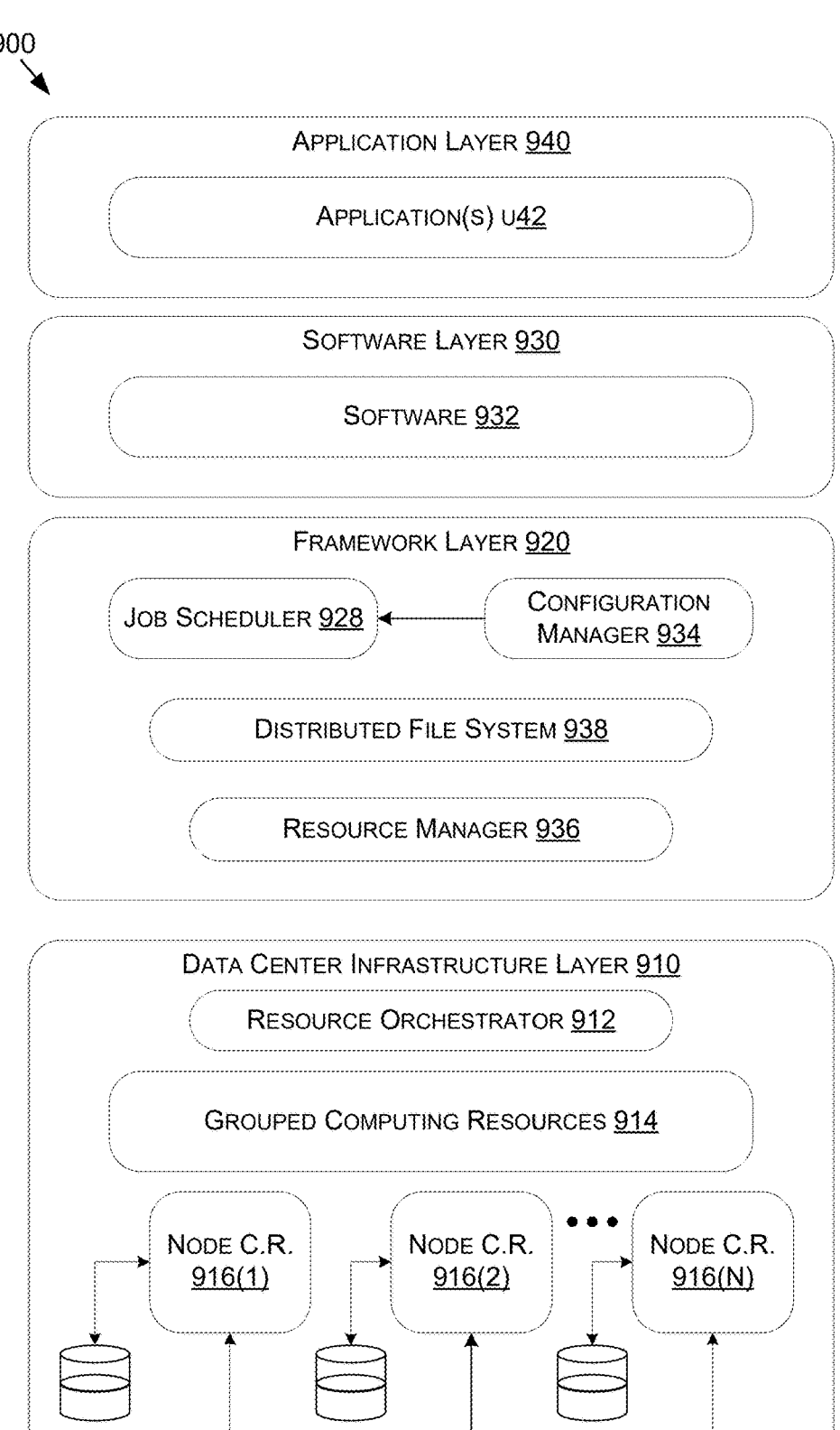
FIG. 9 is a block diagram of an example data center suitable for use in implementing some embodiments of the present disclosure.

FIG. 9 illustrates an example data center 900 that may be used in at least one embodiments of the present disclosure, such as to implement the system 100, the operations described in connection with FIG. 2, or in one or more examples of the data center 900. The data center 900 may include a data center infrastructure layer 910, a framework layer 920, a software layer 930, and/or an application layer 940.

As shown in FIG. 9, the data center infrastructure layer 910 may include a resource orchestrator 912, grouped computing resources 914, and node computing resources ("node C.R.s") 916(1)-916(N), where "N" represents any whole, positive integer. In at least one embodiment, node C.R.s 916(1)-916(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 916(1)-916(N) may correspond to a server having one or more of the above-mentioned computing resources. In addition, in some embodiments, the node C.R.s 916(1)-916(N) may include one or more virtual components, such as vGPUs, vCPUs, and/or the like, and/or one or more of the node C.R.s 916(1)-916(N) may correspond to a virtual machine (VM).

In at least one embodiment, grouped computing resources 914 may include separate groupings of node C.R.s 916 housed within one or more racks (not shown), or many racks housed in data centers at various geographical locations (also not shown). Separate groupings of node C.R.s 916 within grouped computing resources 914 may include grouped compute, network, memory or storage resources that may be configured or allocated to support one or more workloads. In at least one embodiment, several node C.R.s 916 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 912 may configure or otherwise control one or more node C.R.s 916(1)-916(N) and/or grouped computing resources 914. In at least one embodiment, resource orchestrator 912 may include a software design infrastructure (SDI) management entity for the data center 900. The resource orchestrator 912 may include hardware, software, or some combination thereof.

In at least one embodiment, as shown in FIG. 9, framework layer 920 may include a job scheduler 928, a configuration manager 934, a resource manager 936, and/or a distributed file system 938. The framework layer 920 may include a framework to support software 932 of software layer 930 and/or one or more application(s) 942 of application layer 940. The software 932 or application(s) 942 may respectively include web-based service software or applications, such as those provided by Amazon Web Services, Google Cloud and Microsoft Azure. The framework layer 920 may be, but is not limited to, a type of free and open-source software web application framework such as Apache Spark™ (hereinafter "Spark") that may utilize distributed file system 938 for large-scale data processing (e.g., "big data"). In at least one embodiment, job scheduler 928 may include a Spark driver to facilitate scheduling of workloads supported by various layers of data center 900. The configuration manager 934 may be capable of configuring different layers such as software layer 930 and framework layer 920 including Spark and distributed file system 938 for supporting large-scale data processing. The resource manager 936 may be capable of managing clustered or grouped computing resources mapped to or allocated for support of distributed file system 938 and job scheduler 928. In at least one embodiment, clustered or grouped computing resources may include grouped computing resource 914 at data center infrastructure layer 910. The resource manager 936 may coordinate with resource orchestrator 912 to manage these mapped or allocated computing resources.

In at least one embodiment, software 932 included in software layer 930 may include software used by at least portions of node C.R.s 916(1)-916(N), grouped computing resources 914, and/or distributed file system 938 of framework layer 920. One or more types of software may include, but are not limited to, Internet web page search software, e-mail virus scan software, database software, and streaming video content software.

In at least one embodiment, application(s) 942 included in application layer 940 may include one or more types of applications used by at least portions of node C.R.s 916(1)-916(N), grouped computing resources 914, and/or distributed file system 938 of framework layer 920. One or more types of applications may include, but are not limited to, any number of a genomics application, a cognitive compute, and a machine-learning application, including training or inferencing software, machine-learning framework software (e.g., PyTorch, TensorFlow, Caffe, etc.), and/or other machine-learning applications used in conjunction with one or more embodiments.

In at least one embodiment, any of configuration manager 934, resource manager 936, and resource orchestrator 912 may implement any number and type of self-modifying actions based at least on any amount and type of data acquired in any technically feasible fashion. Self-modifying actions may relieve a data center operator of data center 900 from making possibly bad configuration decisions and possibly avoiding underutilized and/or poor performing portions of a data center.

The data center 900 may include tools, services, software, or other resources to update/train one or more machine-learning models or predict or infer information using one or more machine-learning models according to one or more embodiments described herein. For example, a machine-learning model(s) may be updated/trained by calculating weight parameters according to a neural network architecture using software and/or computing resources described above with respect to the data center 900. In at least one embodiment, trained or deployed machine-learning models corresponding to one or more neural networks may be used to infer or predict information using resources described above with respect to the data center 900 by using weight parameters calculated through one or more training techniques, such as but not limited to those described herein.

In at least one embodiment, the data center 900 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to update/train or perform inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 800 of FIG. 8—e.g., each device may include similar components, features, and/or functionality of the computing device(s) 800. In addition, where backend devices (e.g., servers, NAS, etc.) are implemented, the backend devices may be included as part of a data center 900, an example of which is described in more detail herein with respect to FIG. 9.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 800 described herein with respect to FIG. 8. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. One or more processors comprising:
one or more circuits to:
    identify a frame of a video stream, the frame having at least one region of interest;
    determine that the frame comprises corrupted or lost data;
    select a first error concealment function for a first portion of the corrupted or lost data within the at least one region of interest, and a second error concealment function for a second portion of the corrupted or lost data outside of the at least one region of interest in the frame; and
    generate a corrected frame by applying the first error concealment function to the first portion of the corrupted or lost data and by applying the second error concealment function to the second portion of the corrupted or lost data.

2. The one or more processors of claim 1, wherein the one or more circuits are to apply the first error concealment function or the second error concealment function by providing the frame as input to a machine-learning model.

3. The one or more processors of claim 1, wherein the one or more circuits are to:
receive an encoded bitstream of the video stream; and
generate the frame by decoding the encoded bitstream, wherein decoding the frame indicates a location of the corrupted or lost data.

4. The one or more processors of claim 1, wherein the first error concealment function and the second error concealment function are two of three or more error concealment functions.

5. The one or more processors of claim 1, wherein the one or more circuits are to:
determine that an object is detected in a predetermined number of prior frames in the video stream; and
select the first error concealment function from a plurality of error concealment functions based at least on the object being detected in the predetermined number of prior frames, the first error concealment function using a greater amount of computing resources relative to the second error concealment function of the plurality of error concealment functions.

6. The one or more processors of claim 5, wherein the one or more circuits are to:
select the first error concealment function based on the object being estimated to appear at least in the first portion of the corrupted or lost data.

7. The one or more processors of claim 1, wherein the one or more processors are comprised in at least one of:
a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for 3D assets;
a system for performing deep learning operations;
a system implemented using an edge device;
a system implemented using a robot;
a system for performing conversational AI operations;
a system for performing generative AI operations using a large language model (LLM);
a system for performing generative AI operations using a vision language model (VLM);
a system for generating synthetic data;
a system incorporating one or more virtual machines (VMs);
a system implemented at least partially in a data center; or
a system implemented at least partially using cloud computing resources.

8. A system, comprising:
one or more processors to:
receive a request to process a video stream comprising a plurality of frames;
apply a first error concealment function and a second error concealment function to at least one frame of the plurality of frames, wherein the first error concealment function is selected for a first portion of corrupted or lost data of the at least one frame within at least one region of interest, and the second error concealment function is selected for a second portion of the corrupted or lost data of the at least one frame outside of the at least one region of interest; and
execute a machine-learning model using the at least one frame as input for the request.

9. The system of claim 8, wherein the one or more processors are to:
determine that the at least one frame comprises the corrupted or lost data using a decoding process.

10. The system of claim 8, wherein the machine-learning model generates an indication of an object in the at least one frame, and wherein the one or more processors are to:
select a third error concealment function for at least one second frame of the plurality of frames based at least on the indication of the object in the at least one frame.

11. The system of claim 10, wherein the third error concealment function for the at least one second frame is selected further based on an expected location of the object in the at least one second frame.

12. The system of claim 8, wherein a location of the corrupted or lost data is one of a macroblock location or a slice location of the at least one frame.

13. The system of claim 8, wherein the one or more processors are to:
apply at least one of the first error concealment function or the second error concealment function by executing a second machine-learning model using the at least one frame as input, the second machine-learning model to generate replacement information for the corrupted or lost data of the at least one frame.

14. The system of claim 8, wherein the system is comprised in at least one of:
a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for 3D assets;
a system for performing deep learning operations;
a system implemented using an edge device;
a system implemented using a robot;
a system for performing conversational AI operations;
a system for performing generative AI operations using a large language model (LLM);
a system for performing generative AI operations using a vision language model (VLM);
a system for generating synthetic data;
a system incorporating one or more virtual machines (VMs);
a system implemented at least partially in a data center; or
a system implemented at least partially using cloud computing resources.

15. A method, comprising:
identifying, using one or more processors, a frame of a video stream, the frame having at least one region of interest;
determining, using the one or more processors, that the frame comprises corrupted or lost data;
selecting, using the one or more processors, a first error concealment function for a first portion of the corrupted or lost data within the at least one region of interest, and a second error concealment function for a second portion of the corrupted or lost data outside of the at least one region of interest in the frame; and generating, using the one or more processors, a corrected frame by applying the first error concealment function to the first portion of the corrupted or lost data and the second error concealment function to the second portion of the corrupted or lost data.

* * * * *